Patented Aug. 10, 1937

2,089,606

UNITED STATES PATENT OFFICE 2,089,606

DISPERSION METHOD

Winfield Walter Heckert, Ardentown, Del., assignor, by mesne assignments, to E. I. du Pont de Nemours & Company, Wilmington, Del., a corporation of Delaware No Drawing. Application October 11, 1934, Serial No. 747,933

4 Claims. (Cl. 252—6)

This invention relates to the art of dispersing, and in particular, it pertains to a method of obtaining the dispersion of uniformly fine particles of an organic pigment or pigment-like material adapted for use in artificial silk spinning solution to produce low luster yarn.

It has been found that certain comparatively low melting point, substantially colorless, organic compounds, having a plurality of nuclei highly deficient in hydrogen, will serve extremely well as pigments for various purposes. Although substantially larger particles thereof have no more hiding power than a corresponding amount of many other organic or inorganic materials, when in finely divided form a product is obtained which has surprising hiding power, greater than that of some of the well known inorganic white pigments. Still more surprising was the fact that these pigments appear to have a greater hiding power than could be anticipated from the average of their principal indices of refraction. This is probably due to the very high birefractive property of the particles which is particularly brought out in their finely divided state.

Considerable difficulty has been experienced in obtaining organic compounds of this character in a sufficiently finely divided form, that is, below 2-4 microns in diameter.

Materials which melt below 100° C. have been emulsified in hot water by known methods. The low viscosity of the medium and the excessive foam and froth produced by the stirring generally results in wide variation in particle size. It is very difficult or impossible to produce emulsions with practically all of the particles below two microns in diameter, particularly when the disperse phase has a rather high viscosity. Materials which melt above 100° have been emulsified in water above the boiling point under pressure. This method requires rather complicated apparatus and also has the disadvantage of the low viscosity medium. Materials which melt above the boiling point of water have been dissolved in volatile organic solvents and then emulsified in water. The organic solvent is removed by steam distillation. Unless great care is taken emulsions generally break during the process of distillation. Emulsions of materials melting above the boiling point of water have also been prepared in glycerine or other non-aqueous, high-boiling liquids. While good emulsions can be prepared in this manner, the presence of glycerine in the final emulsion is often objectionable. Furthermore, many organic materials are slightly soluble in glycerine so that the glycerine emulsions are not stable; the particles tend to grow into large crystals as the emulsion cools or stands for a period of time.

Grinding methods are known whereby materials may be ground, in part at least, to particles of small dimensions (below 2-4 microns). Thus, a water slurry may be ground down completely in a pebble mill, ball mill, or a colloid mill, but extremely long grinding periods are required to grind all of the particles to dimensions below 2-4 microns.

Methods for particle size reduction are also known involving the application of large shearing forces such as by passage of a slurry through a small orifice. Small particles have also been obtained by drowning solutions of the material in water. All of these methods, when applied to certain comparatively low melting point organic substances, are open to one or more objections as referred to above. No fully satisfactory methods exist for the removal of undesirable elements in the dispersion such as glycerine or other non-aqueous materials, or large volumes of water which are added before the centrifuging step. The dispersions will not filter properly because of their fine particle size. Vacuum concentration is too expensive. Boiling results in crystal growth and/or coagulation of the dispersion.

It is an object of this invention to prepare concentrated dispersions and emulsions of water-insoluble, polynuclear, organic compounds, highly deficient in hydrogen, with very fine particle size. Another object is to eliminate excessively long grinding periods in the preparation of concentrated dispersions and emulsions with very fine particle size. It is one object of the invention to prepare water dispersions and emulsions of water-insoluble, polynuclear organic compounds, highly deficient in hydrogen, which are solid at ordinary temperatures without the use of solvents for the compound emulsified. Another object is to prepare emulsions or dispersions of materials which contain particles exceptionally uniform and very small in particle size. For example, dispersions or emulsions may be prepared, the particles of which are uniformly 1-2 microns or less in diameter. Other objects of the invention will appear hereinafter.

It has been found that by properly choosing the dispersing or emulsifying agent, dispersions of solid organic materials prepared and processed by any of the means common to the art may be flocculated with suitable reagents, filtered or otherwise concentrated and washed, and then redispersed. During the process any undesirable elements of the original dispersion medium may be eliminated and the dispersion may be concentrated to a form suitable for storage or shipment.

It is also possible to form a desirable dispersion by first grinding the solid matter forming a dispersion or emulsion, flocculating with a suitable flocculation agent, filtering and drying.

The choice of an emulsifying agent is governed by a number of factors. It must be capable of precipitation and should preferably be capable of reversible precipitation, that is, it should be capable of precipitation and repeptization by the addition of small quantities of simple reagents such as acids or bases. For use in grinding processes, it is desirable that it be comparatively non-foaming. For use in emulsification processes where grinding is not necessary, it must be sufficiently stable at the melting point of the material which is to be emulsified that stable emulsions can be obtained. It should be soluble in or swollen by the emulsifying medium.

Having prepared the dispersion or emulsion with the proper dispersing agent, it can be diluted and processed in some manner to control particle size, as by settling, centrifuging, selective filtration, etc. It is then flocculated with an acid or other soluble electrolyte. Flocculation is most complete at the isoelectric point of the dispersing agent. With certain proteins it is desirable to add ammonium sulfate at this stage to aid in the precipitation of the emulsion or dispersion. The flocculated dispersion may now be washed by any of the known methods such as decantation, press washing, etc. The slurry or press cake is then redispersed by the addition of alkali and/or additional dispersing agent followed by vigorous agitation.

EXAMPLE 1.—EMULSIFICATION OF DIETHYLENEGLYCOL-DI-BETA-NAPHTHYL ETHER (M. P. 120°)

*Preparation of emulsifying agent*

Twenty grams of fish glue are dispersed in 600 grams of boiling water. Two hundred and eighty grams of high pH value casein, such as that sold by the Sheffield Products Co. of Hobart, New York, is stirred into the mixture. This is dispersed with 28 cc. of triethanolamine. One thousand grams of glycerine are added and the mixture is boiled until a temperature of 128° C. is reached. At this point, the mixture is diluted to 3000 grams with glycerine. This will be referred to hereafter as the "casein colloid".

*Preparation of emulsion*

Twelve hundred grams of glycerine are heated to 120° C. and charged into the bowl of a small colloid mill. This mill is equipped in such a manner that the material after passing between the rotor and stator is returned to the bowl. Four hundred and fifty grams of sugar are added and the material is allowed to recirculate until the temperature reaches 120° C. At this point, 600 grams of the casein-colloid described in the preceding paragraph are charged into the mill, together with 5 grams of the product sold commercially under the name "Nekal AEM" and comprising an alkylated naphthalene sodium sulfonate and a protective colloid of the glue type. The temperature is allowed to reach 120° C. at which point 750 grams of molten di-ethylene-glycol-dibetanaphthyl ether are slowly added to the mill. Recirculation is continued for three to four minutes during which time the temperature rises to about 129° C. At this point the emulsion is discharged into about 2 volumes of cold water. It is flocculated with an acid such as sulfuric, phosphoric or acetic. A pH of 4.6 is best for flocculation. A temperature of 35–45° C. aids flocculation. The flocculated particles are then filtered and washed free of glycerine. The filter cake containing about 50% of water is redispersed by adding 5% of its weight of 30% aqueous sodium hydroxide solution and stirring with a "Lightnin" mixer.

The dispersion medium may be recovered by precipitating the acid in the filtrate and evaporating the excess water.

If it is desired to obtain the diethylene-glycol-di-beta-naphthyl ether as a dry organic pigment, then the filter cake is dried in an oven at 110° and disintegrated, instead of being redispersed in the manner described. The product is characterized by an unusually high hiding power for an organic material and a very fine and exceptionally uniform particle size. One sample had a mean diameter of 0.46 micron.

EXAMPLE 2.—EMULSIFICATION OF DIBENZYL HYDROQUINONE ETHER (M. P. 124°)

The same procedure as in Example 1 is employed, substituting dibenzyl hydroquinone ether for diethylene-glycol-di-naphthyl ether.

EXAMPLE 3.—EMULSIFICATION OF RETENE (M. P. 99°)

42.7 grams of casein are dispersed in 400 cc. of hot water with 4.27 cc. of triethanolamine. 10.7 grams of isopropyl naphthalene sulfonate are dissolved in the solution. This is followed by 1143 grams of cane sugar. Water is added to bring up the total weight to 1600 grams.

Six hundred grams of the above solution are heated to 105° C. Two hundred grams of molten retene are added slowly, stirring with a Hamilton-Beach drink mixer. The temperature is maintained at about 105° and the stirring is continued until the particles average less than one micron in diameter. The emulsion is cooled and dispersed in cold water. It is flocculated with acetic acid, filtered and washed free of sugar. It is redispersed by adding 5% of its weight of 30% sodium hydroxide and 0.5% of Nekal AEM, and stirring with the mixer.

EXAMPLE 4.—EMULSIFICATION OF A CHLORINATED DIPHENYL SUCH AS AROCLOR 4465 (M. P. 70–90°)

Seven hundred fifty grams of dispersion medium containing casein and Nekal AEM are charged into a Disper-mill. It is allowed to recirculate until the temperature reaches 105° C. The temperature is maintained at this point by cooling with a water-jacket attached to the bowl of the mill. Two hundred fifty grams of solid chlorinated diphenyl having a melting point from 70–90° C. (Aroclor 4465) are added. The chlorinated diphenyl melts and is soon reduced to a particle size below one micron in diameter. The emulsion is passed into cold water. It is flocculated with acetic acid and ammonium sulfate, filtered and washed. It is redispersed by stirring with 5% of its weight of 30% sodium hydroxide solution. 0.05% trichlorophenol is preferably added to preserve the casein.

EXAMPLE 5.—DISPERSION OF ETHYLENE GLYCOL-DI-BETA-NAPHTHYL ETHER

This material melts at about 217° C. so that an emulsification process is less satisfactory than a grinding process for reducing the particle size.

A quantity of ethylene glycol di-beta-naphthyl ether is ground in a colloid mill in the manner described in my Patent No. 2,060,210, and in which the ether is ground with a dispersion medium such as casein solution and the fines are used in diluting a previous grind before centrifuging the same. The resulting slurry consisting of particles, approximately 60% of which are below 2 microns in diameter, is diluted with water to 8% ethylene glycol di-beta-naphthyl ether and settled or centrifuged to remove the coarse particles. Moderate settling or centrifuging will remove all particles larger than 4–6 microns in diameter. More strenuous settling or centrifuging will eliminate all particles above 2–3 microns. The resulting slurry, containing only fines, is flocculated with hydrochloric acid and concentrated by filter pressing. The press cake containing 30–50% ethylene glycol di-beta-naphthyl ether is made alkaline with sodium hydroxide and redispersed by stirring with a "Lightnin" mixer. If desired, the press cake may be stored for long periods of time, or shipped to the point at which it is to be used and then be redispersed. Additional casein or other dispersing agents or preservatives may be added during the redispersion step.

EXAMPLE 6.—DISPERSIONS OF OCTACHLORONAPHTHALENE

Fifty pounds of octachloronaphthalene are ground in a Charlotte colloid mill with 50 pounds of water and sufficient saponified shellac to secure satisfactory dispersion. Generally, 7 to 8 pounds of saponified shellac are sufficient. Grinding is discontinued when the slurry contains 50 to 60% of material below 4 microns in diameter. The slurry is diluted with water to 10% octachloronaphthalene and settled 20 inches deep in a tank for 16 hours. The upper 19 inches of slurry containing most of the fines are then drawn off. Hydrochloric acid is added until the slurry is flocculated. It is filtered and washed with water. The press cake is packed in drums and shipped to the point at which the dispersion is to be used. Sufficient sodium hydroxide is added to each drum to make the slurry alkaline. Redispersion is accomplished with a "Lightnin" mixer and by giving the slurry one pass through a small colloid mill.

EXAMPLE 7.—DISPERSION OF COMPLETELY CHLORINATED DIPHENYL

Fifty pounds of completely chlorinated diphenyl are ground in a ball mill with 5 lbs. of Monopole oil (Turkey red oil) in 45 lbs. of 0.05% sodium hydroxide solution until a large proportion of the particles are below 4 microns in diameter. The slurry is diluted and classified, flocculated, filtered, and redispersed as in the case of Example 6.

The practice of the invention is particularly beneficial in the preparation of organic white pigments of high hiding power. These pigments may be prepared as dry dispersions containing a substantial proportion of its particles under 2 microns in diameter. The slurry or press cake which is obtained by the process described above may be redispersed by the addition of alkali and/or additional dispersing agent, followed by vigorous agitation, or the slurry or press cake may be shipped and/or stored and then redispersed, or may be dried and disintegrated to yield a white organic pigment of exceptional hiding power. If desired, the organic white pigment may be concentrated to dryness, following the steps of precipitation and filtration, as by drying in an oven, in which case the particles will be coated with 0.01% to 20% of the dispersing agent used in preparing the dispersion. The pigment may be redispersed in air by disintegration or dry grinding, or in a liquid by the application of grinding or shearing forces.

The new organic pigments can be transferred to organic vehicles without drying if desired, for example, the press cake may be washed with alcohol, then incorporated in other organic solvents or vehicles. Alternatively, the pigment may be flocculated from the aqueous phase to the water-insoluble, organic phase by means well known to the art, for example, by the use of hydrophobic dispersing agents.

White pigments owe their hiding power to the difference between their refractive index and that of the medium in which they are used. We have found that a pigment must show a difference in refractive index of at least 0.1 unit from the medium or its hiding power is very small. Much better results are obtained if the difference in refractive index amounts to 0.2, 0.3, 0.4 unit or more. Hiding power increases with the difference in index. Materials which are strongly birefracting have been found to be particularly effective as white pigments.

It has been found that in general the refractive index of an organic compound increases with the number of carbocyclic or heterocyclic nuclei highly deficient in hydrogen which are present. In this specification any complete ring of atoms is considered a nucleus. Thus, naphthalene and carbazole contain two and three nuclei respectively.

Compounds containing N, S, Se, Te, have been found to have particularly high indices and to make particularly good white pigments. Heterocyclic compounds, highly deficient in hydrogen, containing these atoms are particularly desirable.

Halogenation of carbocyclic and heterocyclic compounds highly deficient in hydrogen raises the refractive index still further. Of particular interest are the completely halogenated compounds, as, for example, completely chlorinated diphenyl, naphthalene, or triphenyl benzene.

While it is preferred to use compounds for the production of these new white pigments which contain simultaneously a very high proportion of groups containing nitrogen, sulfur, selenium, tellurium and halogen atoms together with carbocyclic or heterocyclic nuclei highly deficient in hydrogen, it has been found that very useful white pigments can be prepared from colorless organic compounds containing only four carbocyclic or heterocyclic nuclei highly deficient in hydrogen, as for example, from ethylene glycol di-b-naphthyl ether or N-phenyl carbazole, or from compounds containing fewer nuclei but containing about 30% nitrogen, sulfur, selenium or tellurium, or about 60% halogen, as for example, oxamide (31.8% nitrogen), trimethylene trisulfone (41% sulfur), b-tetrachloronaphthalene (53% chlorine) or hexachloronaphthalene (63% chlorine).

As specific examples of additional organic compounds which may be dispersed or emulsified to particular advantage in accordance with the invention as above set forth, the following may be named:

1. Aromatic hydrocarbons such as triphenyl benzene, anthracene and naphthalene-formaldehyde resins.

2. Halogenated ring hydrocarbons, such as hexachlorobenzene, octachlorobenzene, solid highly chlorinated diphenyls and halowaxes.

3. Organic ethers and their —S—, —Se—, —Te— and —NH— analogues such as dibenzyl hydroquinone ether, di-benzthioazyl-mercapto ethane, and sN-di-beta-naphthyl p-phenylene di-amine.

4. Organic sulfones such as dinaphthyl sulfone or trimethylene trisulfone.

5. Organic ketones such as di-biphenyl ketone.

6. Organic heterocyclic compounds such as methyl dinaphtho xanthene and thianthrene.

7. Organic tertiary amines such as triphenyl amine.

8. Organic amides such as oxamide.

The present invention is not limited to the emulsification or grinding procedures described above, or to the use of casein, Monopole oil, or saponified shellac as dispersing or emulsifying agents. The essential point is that the dispersion agent produces satisfactory dispersions under the conditions employed for subdivision and that these be capable of flocculation and redispersion by some convenient means. We have found casein or mixtures of casein with other dispersing agents such as Monopole oil, the sodium salt of isopropyl naphthalene sulfonic acid, 1,1'-methylene-dinaphthyl-2,2'-disodium sulfonate or gelatin to be most satisfactory. Common soaps and the soaplike alkali-metal salts of various sulfonic acids other than those specifically mentioned above, may also be used. These dispersions are easily flocculated by making slightly acid and are redispersed by the addition of a peptizing agent such as an alkali metal hydroxide. When casein is used as a dispersing agent a preservative is preferably added to prevent bacterial decomposition. Phenols are very suitable for this purpose although other materials suitable for this purpose may be used.

Phosphoric, sulfuric, hydrochloric, and acetic acids, as well as other common acids, may be used as flocculating agents. Dispersions which are protected with proteins flocculate best at the isoelectric point of the protein. In the case of casein, this is at a pH=4.6. Ammonium sulfate is also particularly effective in flocculating proteins. It should be possible to prepare dispersions with gelatin or other proteins and to flocculate these by adjusting to the isoelectric point and adding ammonium sulfate. The ammonium sulfate is washed out and redispersion again becomes possible. Polyvalent cations flocculate many dispersions such as those protected by the more common soaps and may be so employed if it is desired to dry and subsequently disintegrate the concentrated dispersion. The use of polyvalent cations to flocculate the dispersion would be undesirable in the preferred embodiment of this invention which contemplates subsequent redispersion of the concentrated slurry by the addition of a peptizing agent.

For the production of exceedingly fine and uniform particle size there is generally an optimum viscosity for the dispersion medium for every material which is emulsified. In the past, viscosity has been regulated by the use of gums or other colloids such as agar-agar or gum tragacanth. The necessary viscosity is well within the skill of the art and can be easily determined from the above examples. Water emulsions frequently foam so badly during preparation that it is impossible to obtain uniform particle size. Some of the material to be emulsified remains in the foam in the form of large droplets and is never emulsified, so it is frequently desirable to use a viscous non-foaming medium such as a sugar solution in water or a glycerine-sugar solution. Such materials are highly undesirable in the completed emulsion, but this invention offers a means by which these materials may be used in emulsion preparation and later be eliminated.

This method is particularly useful for producing emulsions when conditions do not warrant the construction of expensive apparatus for the preparation of emulsions under pressure.

The production of uniformly finely divided dispersions is not practical by grinding methods unless some means is provided for periodically removing the fines from the coarse, unground material. If particle size specifications require that the separation be made in the range below 8–10 microns, this requires settling or centrifuging operations applied to dilute slurries. Inasmuch as dilute slurries are not adapted to shipment or storage for long periods of time, some means of concentration must be provided. The present invention offers a convenient and satisfactory means of concentrating such slurries to the point where the whole process is commercially feasible.

When materials are ground in ball mills the charge is frequently contaminated with iron or zinc from the steel or zinc balls. The present invention provides a convenient means for washing out this iron or zinc with dilute acid.

The organic pigments prepared according to the practice of this invention are particularly useful in the delustering of artificial silk thread. Pigments used for delustering, according to common practice, are introduced into the cellulosic solution prior to its extrusion through the spinneret. It is desirable that the pigments have substantially all of their particles under 4 microns in diameter, and, preferably, under 2 microns; however, satisfactory hiding power, texture and spinning (in viscose) can be obtained with a product containing 90% of the material as particles between 0 and 4 microns in diameter. The pigments should be uniform in size in order that they may be easily dispersed in the cellulosic solution, e. g. viscose, where rayon of the regenerated cellulose type is to be produced, and, furthermore, in order that they may be uniformly dispersed throughout the artificial thread and thus give a uniform delustering effect and produce a thread of uniform strength. Pigments consisting uniformly of small particles of the size described can readily be extruded through the spinneret together with the cellulosic solution and do not cause an undesirable degree of abrasion on the various elements of the spinning machine.

Any variation or modification which conforms to the spirit of the invention is intended to be included within the scope of the claims.

I claim:

1. The method of preparing an emulsion of an insoluble, aromatic, organic, solid, colorless compound which comprises melting said compound and emulsifying said molten compound in an aqueous medium containing a dispersing agent taken from the class consisting of Turkey red oil, saponified shellac and peptized casein, cooling the emulsion to solidify the dispersed phase, adding an electrolyte to flocculate the emulsion, and redispersing the material by removal of the electrolyte.

2. The method of preparing an emulsion of an insoluble, aromatic, organic, solid, colorless compound which comprises melting said compound and emulsifying said molten compound in an aqueous medium containing Turkey red oil, cooling the emulsion to solidify the dispersed phase, adding an electrolyte to flocculate the emulsion, and redispersing the material by removal of the electrolyte.

3. The method of preparing an emulsion of an insoluble, aromatic, organic, solid, colorless compound which comprises melting said compound and emulsifying said molten compound in an aqueous medium containing saponified shellac, cooling the emulsion to solidify the dispersed phase, adding an electrolyte to flocculate the emulsion, and redispersing the material by removal of the electrolyte.

4. The method of preparing an emulsion of an insoluble, aromatic, organic, solid, colorless compound which comprises melting said compound and emulsifying said molten compound in an aqueous medium containing peptized casein, cooling the emulsion to solidify the dispersed phase, adding an electrolyte to flocculate the emulsion, and redispersing the material by removal of the electrolyte.

WINFIELD WALTER HECKERT.